(12) United States Patent
Xiong et al.

(10) Patent No.: US 8,624,148 B2
(45) Date of Patent: Jan. 7, 2014

(54) ANTI-COLLISION DEVICE FOR PLASMA VERTICAL CUTTING GUN

(75) Inventors: Yanjun Xiong, Wuhan (CN); Wei Gao, Wuhan (CN); Songping Ye, Wuhan (CN); Jie Dong, Wuhan (CN); Lin Wang, Wuhan (CN)

(73) Assignee: Wuhan Farley Plasma Cutting Sys. Co., Ltd., Wuhan (CN)

( * ) Notice: Subject to any disclaimer, the term of this patent is extended or adjusted under 35 U.S.C. 154(b) by 76 days.

(21) Appl. No.: 13/327,746

(22) Filed: Dec. 15, 2011

(65) Prior Publication Data

US 2012/0085737 A1 Apr. 12, 2012

Related U.S. Application Data

(63) Continuation of application No. PCT/CN2010/072840, filed on May 17, 2010.

(30) Foreign Application Priority Data

Jun. 30, 2009 (CN) .................. 2009 2 0087032 U

(51) Int. Cl.
*H05H 1/36* (2006.01)
*B23K 10/00* (2006.01)

(52) U.S. Cl.
USPC ............ 219/121.39; 219/121.48; 219/121.54; 219/121.45; 266/77; 266/92; 901/41

(58) Field of Classification Search
CPC ................................. B23K 10/00; H05H 1/36
USPC .................. 219/121.39, 121.45, 121.48, 136, 219/121.67, 121.54, 121.36; 403/11, 403/DIG. 1; 901/49; 266/62, 69, 77, 92
See application file for complete search history.

(56) References Cited

U.S. PATENT DOCUMENTS

| | | | | |
|---|---|---|---|---|
| 4,303,054 A | * | 12/1981 | Lore | 125/11.01 |
| 5,575,971 A | * | 11/1996 | Bond | 266/66 |
| 5,728,991 A | * | 3/1998 | Takada et al. | 219/121.46 |
| 5,954,446 A | * | 9/1999 | Ireland | 403/11 |
| 6,073,324 A | * | 6/2000 | Narbeshuber | 29/33 K |
| 6,847,181 B2 | * | 1/2005 | Brooks et al. | 318/568.11 |
| 2009/0071944 A1 | * | 3/2009 | Forlong | 219/121.39 |
| 2012/0168413 A1 | * | 7/2012 | Richtsfeld et al. | 219/136 |

* cited by examiner

*Primary Examiner* — Mark Paschall
(74) *Attorney, Agent, or Firm* — Matthias Scholl P.C.; Matthias Scholl

(57) ABSTRACT

An anti-collision device for a plasma vertical cutting gun including a lifting frame of a plasma cutting machine; a connection mechanism; a fixing plate of a cutting gun fixed on the connection mechanism; a concave support plate connected with the lifting frame of the plasma cutting machine; and a proximity switch mounted on the concave support plate. The connection mechanism is mounted between the lifting frame of the plasma cutting machine and the fixing plate of the cutting gun. A contact surface between the connection mechanism and the concave support plate matches. One side of a joint plane between the connection mechanism and the concave support plate is of ferromagnetic materials and the other side is provided with a magnet, thereby attracting each other to realize a magnetic connection. The anti-collision device has comprehensive functions, convenient installation, reasonable structure, and short response time in case of impact.

8 Claims, 2 Drawing Sheets

US 8,624,148 B2

ANTI-COLLISION DEVICE FOR PLASMA VERTICAL CUTTING GUN

CROSS-REFERENCE TO RELATED APPLICATIONS

This application is a continuation of International Patent Application No. PCT/CN2010/072840 with an international filing date of May 17, 2010, designating the United States, now pending, and further claims priority benefits to Chinese Patent Application No. 200920087032.4 filed Jun. 30, 2009. The contents of all of the aforementioned applications, including any intervening amendments thereto, are incorporated herein by reference.

BACKGROUND OF THE TECHNOLOGY

1. Field of the Invention

The invention relates to an anti-collision device for a plasma vertical cutting gun and the anti-collision device is a supporting device of a numerical control (NC) plasma cutting machine.

2. Description of the Related Art

Plasma cutting technique is a technology using high-speed ejected ionized gas blown out of a compressed gas outlet to realize a cutting effect. The principle is that the ionized gas having high-speed, high temperature, high ionizability, and high energy is ejected from the compressed gas outlet to heat the parts to be cut and melt the metal, then the high-speed and high-pressure ionized gas flow mechanically blows the molten metal open, and finally a cutting slot is formed with the moving of the cutting torch.

A plasma cutting machine is composed of five parts, namely, a power supply, a control system, water cooling system, a gas device, and a cutting structure. As an indispensable and important part of the cutting structure of the plasma cutting machine, the design and manufacturing process of a cutting gun's anti-collision device plays a very important role to achieve an excellent safety protection. Especially in the practice, to guarantee a good processing quality and safety protection level, it is required to ensure both excellent stability and protection ability in case of accidents when the cutting torch moves.

Conventional anti-collision devices of cutting guns adopt a rigid connection style, which has a bigger impact on the cutting guns and the protection is insufficient; the response lags when a problem occurs, thus failing to meet the operating requirement.

SUMMARY OF THE INVENTION

In view of the above-described problems, it is one objective of the invention to provide a full-featured and reasonably-structured anti-collision device for a plasma vertical cutting gun to eliminate shortcomings of conventional anti-collision devices and make them to be more flexible, stable, and have excellent safety protection.

To achieve the above objective, in accordance with one embodiment of the invention, there is provided an anti-collision device for a plasma vertical cutting gun comprising:
 a lifting frame of a plasma cutting machine;
 a fixing plate of a cutting gun;
 a proximity switch;
 a connection mechanism; and
 a concave support plate;
 wherein
 the connection mechanism is mounted between the lifting frame of the plasma cutting machine and the fixing plate of the cutting gun;
 the fixing plate of the cutting gun is fixed on the connection mechanism;
 the proximity switch is mounted on the concave support plate connecting with the lifting frame of the plasma cutting machine;
 a contact surface between the connection mechanism and the concave support plate matches; and
 one side of a joint plane between the connection mechanism and the concave support plate is of ferromagnetic materials and the other side is provided with a magnet, thereby attracting each other to realize a magnetic connection.

In a class of this embodiment, the connection mechanism comprises a ferromagnetic isosceles-triangle cushion block connected with the fixing plate of the cutting gun; the concave support plate is arranged with a trapezoid groove whose inclined angle is the same as the apical angle of the isosceles-triangle cushion block; two magnets are symmetrically fixed on two inclined planes of the trapezoid groove of the concave support plate; two waists of the isosceles-triangle cushion block are coupled to the two magnets of the trapezoid groove of the concave support plate to realize a magnetic connection; a detection head of the proximity switch aligns with the apical angle of the isosceles-triangle cushion block; and the concave support plate is of non-ferromagnetic materials.

In a class of this embodiment, the two magnets are symmetrically fixed to vertical central parts of the two inclined planes of the trapezoid groove of the concave support plate; vertical upper and lower portions of the two inclined planes of the trapezoid groove are respectively fixed with a nonmagnetic stable block with the same thickness as the magnet, thereby leveling upper and lower gaps between the isosceles-triangle cushion block and the concave support plate.

In a class of this embodiment, the connection mechanism comprises an isosceles-triangle cushion block connected with the fixing plate of the cutting gun; two magnets are symmetrically fixed on two inclined planes of the isosceles-triangle cushion block; the concave support plate is ferromagnetic and arranged with a trapezoid concave groove, whose inclined angle is the same as the apical angle of the isosceles-triangle cushion block; the two magnets on the isosceles-triangle cushion block are attached to the trapezoid groove to realize a magnetic connection between the concave support plate and the connection mechanism; and a detection head of the proximity switch aligns with the apical angle of the isosceles-triangle cushion block. The isosceles-triangle cushion block is of non-ferromagnetic materials.

In a class of this embodiment, the two magnets on the isosceles-triangle cushion block are symmetrically fixed to vertical central parts of the two inclined planes of the isosceles-triangle cushion block; and the vertical upper and lower portions of the two inclined planes of the isosceles-triangle cushion block are respectively fixed with the nonmagnetic stable block with the same thickness as the magnet, thereby leveling the upper and lower gaps between the isosceles-triangle cushion block and the concave support plate.

In a class of this embodiment, a locating pin is respectively arranged on the upper and lower portions of the isosceles-triangle cushion block, and the corresponding position of the concave support plate is arranged with a matching locating hole.

Advantages of the invention are summarized below: the anti-collision device of the cutting gun of the invention has the advantages of comprehensive functions, convenient installation, reasonable structure, and short response time in case of impact. The device has excellent safety protection ability to shut down immediately.

DETAILED DESCRIPTION OF THE EMBODIMENTS

Figure 1:
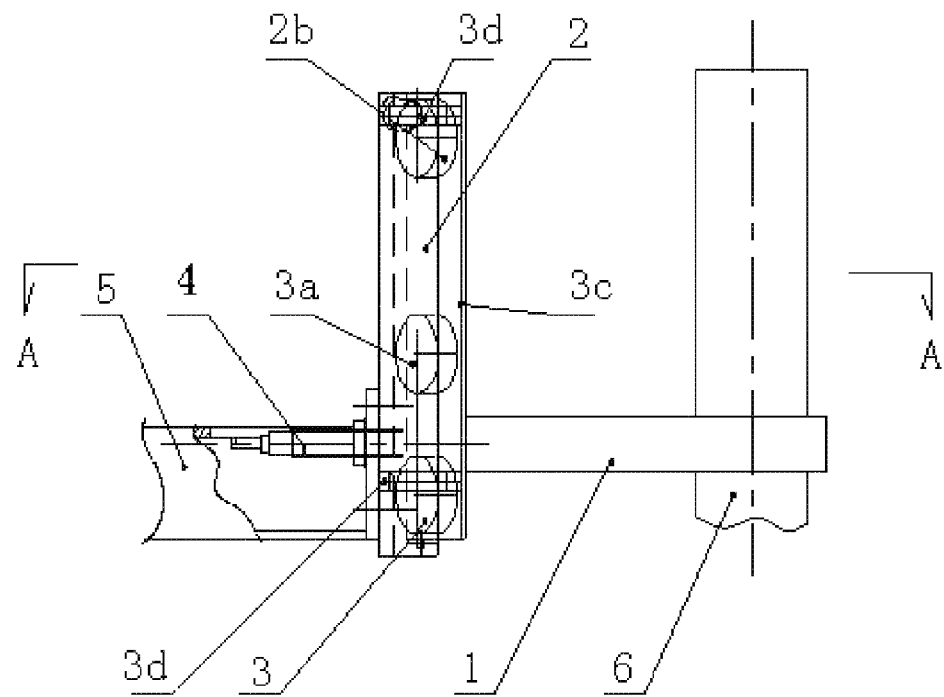
FIG. 1 is a front view of an anti-collision device for a plasma vertical cutting gun of the invention.
Figure 2:
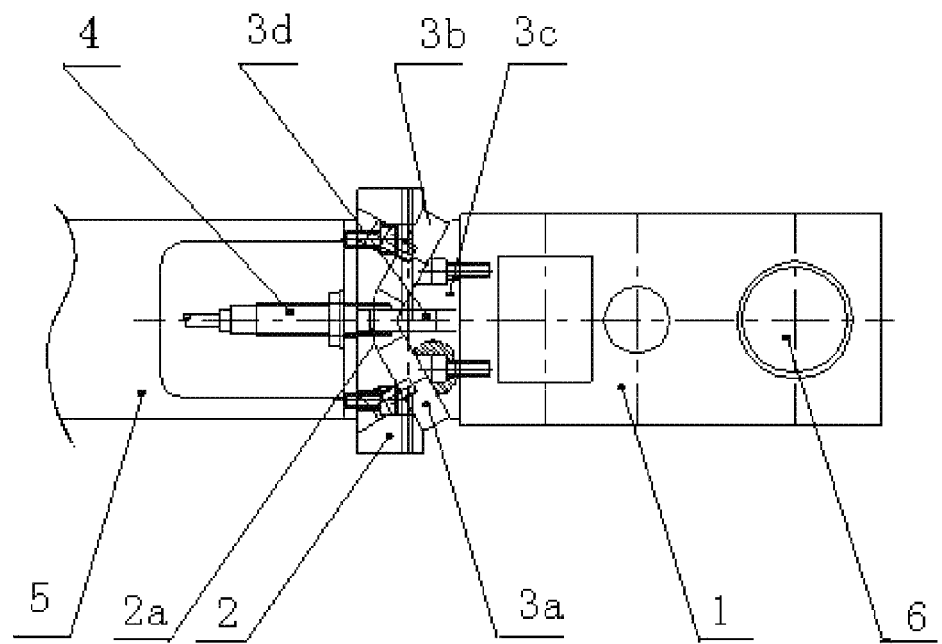
FIG. 2 is an A-A view of FIG. 1.

The invention is explained in further detail below with the aid of the embodiments and attached drawings:

As shown in FIGS. 1-2, an anti-collision device for a plasma vertical cutting gun comprises a lifting frame of a plasma cutting machine 5, a fixing plate of a cutting gun 1, a proximity switch 4, a connection mechanism 3 mounted between the lifting frame of the plasma cutting machine 5 and the fixing plate of the cutting gun 1. The fixing plate of the cutting gun 1 is fixed on the connection mechanism 3. The connection mechanism 3 comprises an isosceles-triangle cushion block 3a connected with the cutting gun fixing panel 1. The upper and lower portions of the isosceles-triangle cushion block 3a are respectively arranged with a locating pin 3b. The proximity switch 4 is mounted on a concave support plate 2 connecting with the lifting frame of the plasma cutting machine 5. A detection head of the proximity switch 4 aligns with the apical angle of the isosceles-triangle cushion block 3a. The connection part of the connection mechanism 3 matches a trapezoid groove 2a of the concave support plate 2, i.e. the apical angle of the isosceles-triangle cushion block 3a is the same as the inclined angle of the trapezoid groove 2a of the concave support plate 2. One side of a joint plane between the connection mechanism 3 and the trapezoid groove 2a of the concave support plate 2 is of ferromagnetic materials and the other side is provided with a magnet, thereby attracting each other to realize a magnetic connection. The detection range of the proximity switch 4 is within 3 mm and the proximity switch 4 will act when the distance between the proximity switch 4 and the apical angle of the isosceles-triangle ferromagnetic cushion block 3a is greater than 3 mm.

Figure 3:
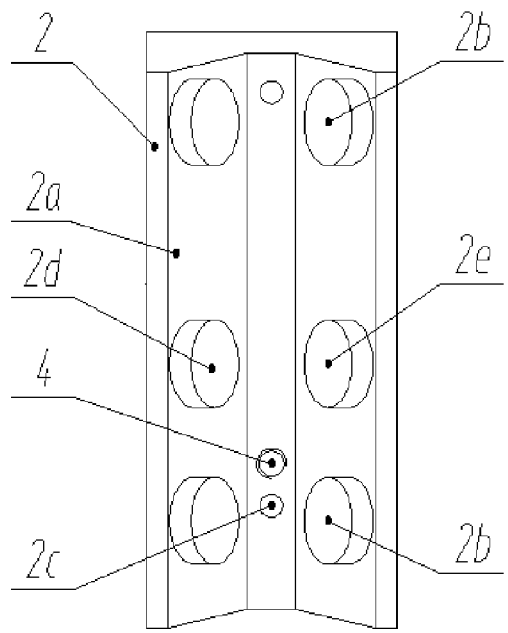
FIG. 3 is a right side view of a concave support plate according to one embodiment of the invention.
Figure 4:
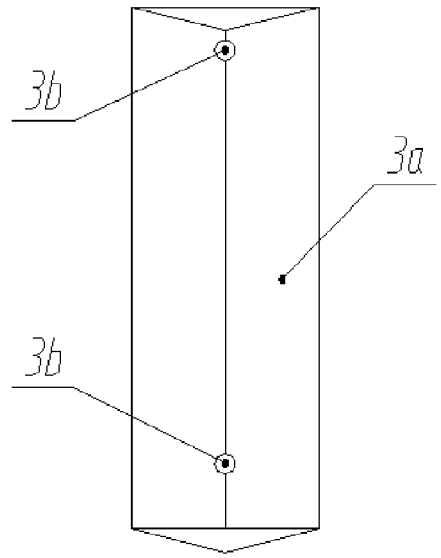
FIG. 4 is a left side view of a connection mechanism corresponding to FIG. 3.

As shown in FIGS. 3-4, the isosceles-triangle cushion block 3a is of ferromagnetic materials. The two magnets 2d and 2e are symmetrically fixed to the vertical central parts of two inclined planes of the trapezoid groove 2a of the concave support plate 2, which is of non-ferromagnetic material such as aluminum. The upper and lower portions of the trapezoid groove 2 corresponding to two waists of the isosceles-triangle cushion block 3a are respectively arranged with a nonmagnetic stable block 2b with the same thickness as the magnets 2d and 2e, thereby leveling the trapezoid groove 2 of the concave support plate 2. Because too many magnets will cause large magnetic force and natural shedding is hardly to be achieved after a cutting gun 6 is impacted, thus four non-magnetic stable blocks 2b with the same thickness as the magnets 2d and 2e are mounted to both reduce the magnetic force and level up the installation plane of the isosceles-triangle cushion block 3a, thereby further stabilizing the isosceles-triangle cushion block 3a. The concave support plate 2 is of non-ferromagnetic materials such as an aluminum alloy.

The upper and lower portions of the isosceles-triangle cushion block 3a are respectively arranged with the locating pin 3b, and the corresponding position of the concave support plate 2 is arranged with a matching locating hole 2c to keep the relative position unchanged after each installation.

Figure 5:
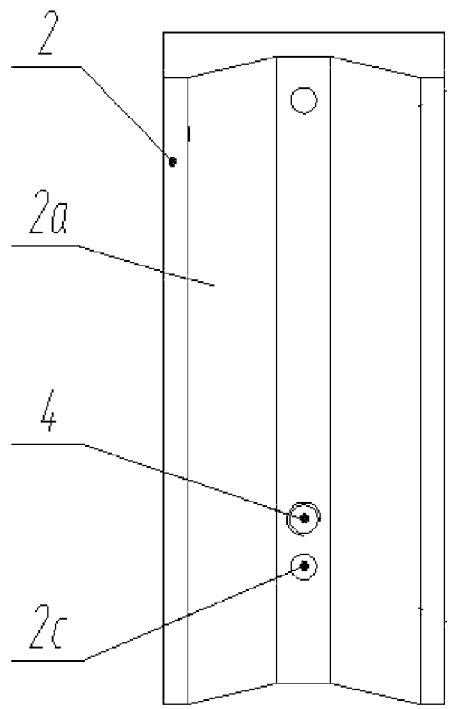
FIG. 5 is a right side view of another concave support plate according to another embodiment of the invention.
Figure 6:
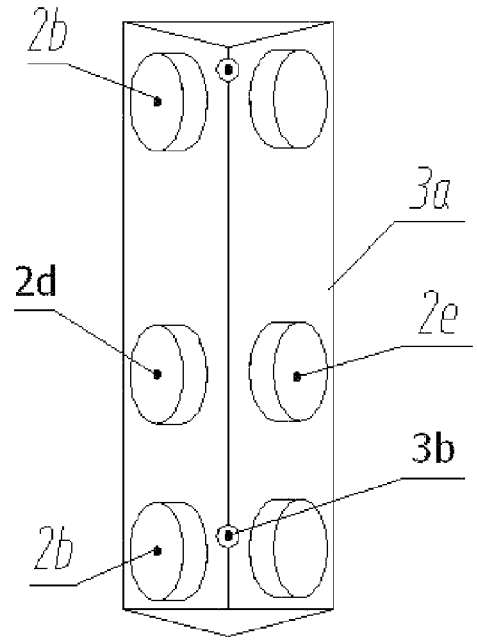
FIG. 6 is a left side view of a connection mechanism corresponding to FIG. 5.

As shown in FIGS. 5-6, the connection mechanism 3 comprises an isosceles-triangle cushion block 3a connected with the fixing plate of the cutting gun 1. The two magnets 2d and 2e are symmetrically fixed on the inclined plane of the isosceles-triangle cushion block 3a. The concave support plate 2 is ferromagnetic and arranged with a trapezoid groove 2a, whose inclined angle is the same as the apical angle of the isosceles-triangle cushion block 3a. The two magnets 2d and 2e on the isosceles-triangle cushion block 3a are attached to the trapezoid groove 2a to realize a magnetic connection between the concave support plate 2 and the connection mechanism 3. The detection head of the proximity switch 4 aligns with the apical angle of the isosceles-triangle cushion block 3a, which is of non-ferromagnetic materials.

The two magnets 2d and 2e on the isosceles-triangle cushion block 3a are symmetrically fixed to the vertical central parts of the two inclined planes of the isosceles-triangle cushion block 3a. The vertical upper and lower portions of the two inclined planes of the isosceles-triangle cushion block 3a are respectively arranged with a nonmagnetic stable block 2b with the same thickness as the magnets 2d and 2e, thereby leveling the upper and lower gaps between the isosceles-triangle cushion block 3a and the concave support plate 2.

The upper and lower parts of the isosceles-triangle cushion block 3a are respectively arranged with a locating pin 3b; the corresponding position of the concave support plate 2 is arranged with a matching locating hole 2c to keep the relative position unchanged after each installation.

In use, screws are employed to fix the concave support plate 2 on the lifting frame of the plasma cutting machine 5 and thereafter the connection mechanism 3 is installed. Two locating pins 3d on the isosceles-triangle cushion block 3a are aligned with the locating holes 2c in the concave support plate 2 so that the connection mechanism 3 is directly absorbed on the concave support plate 2, thereby completing the installation of the anti-collision device. Finally, the cutting gun 6 is mounted in the hole of the fixing plate of the cutting gun 1 based on a suitable cutting height and distance.

When the cutting gun 6 is impacted, both the fixing plate of the cutting gun 1 and the cutting gun 6, together with the isosceles-triangle cushion block 3a, will detach from the concave support plate 2, meanwhile the proximity switch 4 will acquire a faded signal within the detection distance and send it to a programmable logic controller (PLC), which will shut down the whole equipment immediately to avoid damage.

In the process of plasma cutting, the plasma cutting gun 6 or other parts of the cutting machine may be damaged because of too large panel deformation or collision between a foreign body and the plasma cutting gun 6. This invention has remedied the deficiency by freeing the cutting gun 6 from the cutting system and changing a rigid connection into a soft connection. When the cutting gun 6 is impacted, the proximity switch 4 will immediately acquire a faded signal within the detection distance to protect the cutting gun.

The essence of this invention is that the concave support plate 2 and the isosceles-triangle cushion block 3a are connected by magnetic force produced by two circular magnets rather than screws. Consequently, all soft connections between the fixing plate of the cutting gun and the lifting frame of the plasma cutting machine are within the scope of the invention.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An anti-collision device for a plasma vertical cutting gun, the device comprising:
   a) a lifting frame of a plasma cutting machine;
   b) a fixing plate of a cutting gun;
   c) a proximity switch;
   d) a connection mechanism; and
   e) a concave support plate;
   wherein:
   said connection mechanism is mounted between said lifting frame of said plasma cutting machine and said fixing plate of said cutting gun;
   said fixing plate of said cutting gun is fixed on said connection mechanism;
   said proximity switch is mounted on said concave support plate connecting with said lifting frame of said plasma cutting machine;
   a contact surface between said connection mechanism and said concave support plate matches;
   one side of a joint plane between said connection mechanism and said concave support plate is of ferromagnetic materials and the other side thereof is provided with a magnet, thereby attracting each other to realize a magnetic connection;
   said connection mechanism comprises a ferromagnetic isosceles-triangle cushion block connected with said fixing plate of said cutting gun;
   said concave support plate is arranged with a trapezoid groove whose inclined angle is the same as the apical angle of said isosceles-triangle cushion block;
   two magnets are symmetrically fixed on two inclined planes of said trapezoid groove of said concave support plate;
   two waists of said isosceles-triangle cushion block are coupled to said two magnets of said trapezoid groove of said concave support plate to realize a magnetic connection; and
   a detection head of said proximity switch aligns with the apical angle of said isosceles-triangle cushion block.

2. The anti-collision device of claim 1, wherein
   said two magnets are symmetrically fixed to vertical central parts of said two inclined planes of said trapezoid groove of said concave support plate; and
   vertical upper and lower portions of said two inclined planes of said trapezoid groove are respectively fixed with a nonmagnetic stable block with the same thickness as said magnet, thereby leveling upper and lower gaps between said isosceles-triangle cushion block and said concave support plate.

3. An anti-collision device for a plasma vertical cutting gun, the device comprising:
   a) a lifting frame of a plasma cutting machine;
   b) a fixing plate of a cutting gun;
   c) a proximity switch;
   d) a connection mechanism; and
   e) a concave support plate;
   wherein:
   said connection mechanism is mounted between said lifting frame of said plasma cutting machine and said fixing plate of said cutting gun;
   said fixing plate of said cutting gun is fixed on said connection mechanism;
   said proximity switch is mounted on said concave support plate connecting with said lifting frame of said plasma cutting machine;
   a contact surface between said connection mechanism and said concave support plate matches;
   one side of a joint plane between said connection mechanism and said concave support plate is of ferromagnetic materials and the other side thereof is provided with a magnet, thereby attracting each other to realize a magnetic connection;
   said connection mechanism comprises an isosceles-triangle cushion block connected with said fixing plate of said cutting gun;
   two magnets are symmetrically fixed on two inclined planes of said isosceles-triangle cushion block;
   said concave support plate is ferromagnetic and arranged with a trapezoid concave groove, whose inclined angle is the same as the apical angle of said isosceles-triangle cushion block;
   said two magnets on said isosceles-triangle cushion block are attached to said trapezoid groove to realize a magnetic connection between said concave support plate and said connection mechanism; and
   a detection head of said proximity switch aligns with the apical angle of said isosceles-triangle cushion block.

4. The anti-collision device of claim 3, wherein
   said two magnets on said isosceles-triangle cushion block are symmetrically fixed to vertical central parts of said two inclined planes of said isosceles-triangle cushion block; and
   vertical upper and lower portions of said two inclined planes of said isosceles-triangle cushion block are respectively fixed with a nonmagnetic stable block with the same thickness as said magnet, thereby leveling upper and lower gaps between said isosceles-triangle cushion block and said concave support plate.

5. The anti-collision device of claim 1, wherein a locating pin is respectively arranged on upper and lower portions of said isosceles-triangle cushion block, and a corresponding position of said concave support plate is arranged with a matching locating hole.

6. The anti-collision device of claim 3, wherein a locating pin is respectively arranged on upper and lower portions of said isosceles-triangle cushion block, and a corresponding position of said concave support plate is arranged with a matching locating hole.

7. The anti-collision device of claim 1, wherein said concave support plate is of non-ferromagnetic materials.

8. The anti-collision device of claim 3, wherein said isosceles-triangle cushion block is of non-ferromagnetic materials.

* * * * *